US006701759B2

(12) United States Patent  
Joffrey

(10) Patent No.: US 6,701,759 B2  
(45) Date of Patent: Mar. 9, 2004

(54) ANTI-THEFT DEVICE FOR PROTECTING AN AUTOMOBILE AND ITS AIRBAG

(76) Inventor: Javed H. Joffrey, 10327 B. Gramercy Pl., Riverside, CA (US) 92505

( * ) Notice: Subject to any disclaimer, the term of this patent is extended or adjusted under 35 U.S.C. 154(b) by 0 days.

(21) Appl. No.: 10/245,003

(22) Filed: Sep. 16, 2002

(65) Prior Publication Data

US 2003/0217573 A1 Nov. 27, 2003

Related U.S. Application Data

(60) Provisional application No. 60/382,315, filed on May 22, 2002.

(51) Int. Cl.$^7$ .............................................. B60R 25/02
(52) U.S. Cl. ............................... 70/209; 70/226; 70/232
(58) Field of Search ............................. 70/14, 58, 232, 70/209–212, 225, 226

(56) References Cited

U.S. PATENT DOCUMENTS

| | | | | |
|---|---|---|---|---|
| 1,154,389 A | * | 9/1915 | Fogelsang | 70/209 |
| 1,329,913 A | * | 2/1920 | McGuire | 70/209 X |
| 1,368,054 A | * | 2/1921 | Recher | 70/212 |
| 1,395,532 A | * | 11/1921 | Tilden | 70/212 |
| 2,785,564 A | * | 3/1957 | Rossi | 70/232 |
| 3,269,159 A | * | 8/1966 | Young | 70/232 |
| 3,380,267 A | * | 4/1968 | Winchester | 70/232 |
| 3,982,602 A | * | 9/1976 | Gorman | 180/114 |
| 4,326,740 A | * | 4/1982 | Guiler | 70/232 X |
| 4,405,161 A | * | 9/1983 | Young et al. | 70/232 X |
| 4,561,273 A | * | 12/1985 | Robinson | 70/426 |
| 4,630,456 A | * | 12/1986 | Nielsen, Jr. | 70/232 |
| 4,777,811 A | * | 10/1988 | Binkley et al. | 70/232 X |
| 5,246,345 A | * | 9/1993 | Adams, Jr. | 70/232 X |
| 5,359,866 A | * | 11/1994 | Boddy | 70/232 X |
| 5,417,093 A | * | 5/1995 | Heiberg | 70/232 |
| 5,540,067 A | * | 7/1996 | Kim | 70/209 |
| 5,555,754 A | * | 9/1996 | Ferrante | 70/209 |
| 5,605,063 A | * | 2/1997 | Taurog | 70/209 |
| 5,619,873 A | * | 4/1997 | Wood | 70/209 |
| 5,755,122 A | * | 5/1998 | Higginson | 70/209 |
| 5,842,361 A | * | 12/1998 | Banez | 70/209 |
| 5,845,520 A | * | 12/1998 | Dolev | 70/232 X |
| 5,868,016 A | * | 2/1999 | Duran, Sr. | 70/209 |
| 5,992,190 A | * | 11/1999 | Townsend | 70/209 |
| 6,018,968 A | * | 2/2000 | Sides | 70/14 |
| 6,519,981 B1 | * | 2/2003 | Lovak | 70/18 |

* cited by examiner

Primary Examiner—Suzanne Dino Barrett  
(74) Attorney, Agent, or Firm—Gene Scott-Patent Law & Venture Group

(57) ABSTRACT

An antitheft apparatus comprising a steering assembly for a vehicle, the steering assembly providing a centrally positioned hub portion enclosing a shock actuated airbag, and extending around the hub portion, a steering wheel portion; and a theft-resistant cover. The cover provides a circular face portion covering the steering assembly and a circular peripheral flange portion extensive circumferentially from the face portion and therefrom, around the steering wheel portion of the steering assembly. The cover is split into two opposing cover halves along a central split line. At one end of the split line and integral with the cover halves, a device for locking the cover halves about the steering wheel portion is engaged. And at the other end of the split line, and integral with the cover halves, a hinging device allows pivotal movement of the cover halves between a closed position engaging the locking device and an open position disengaging the locking device. Dual abutting faces of the cover halves provide a recessive groove and a protruding tongue so that, when engaged jimmy action is thwarted.

5 Claims, 1 Drawing Sheet

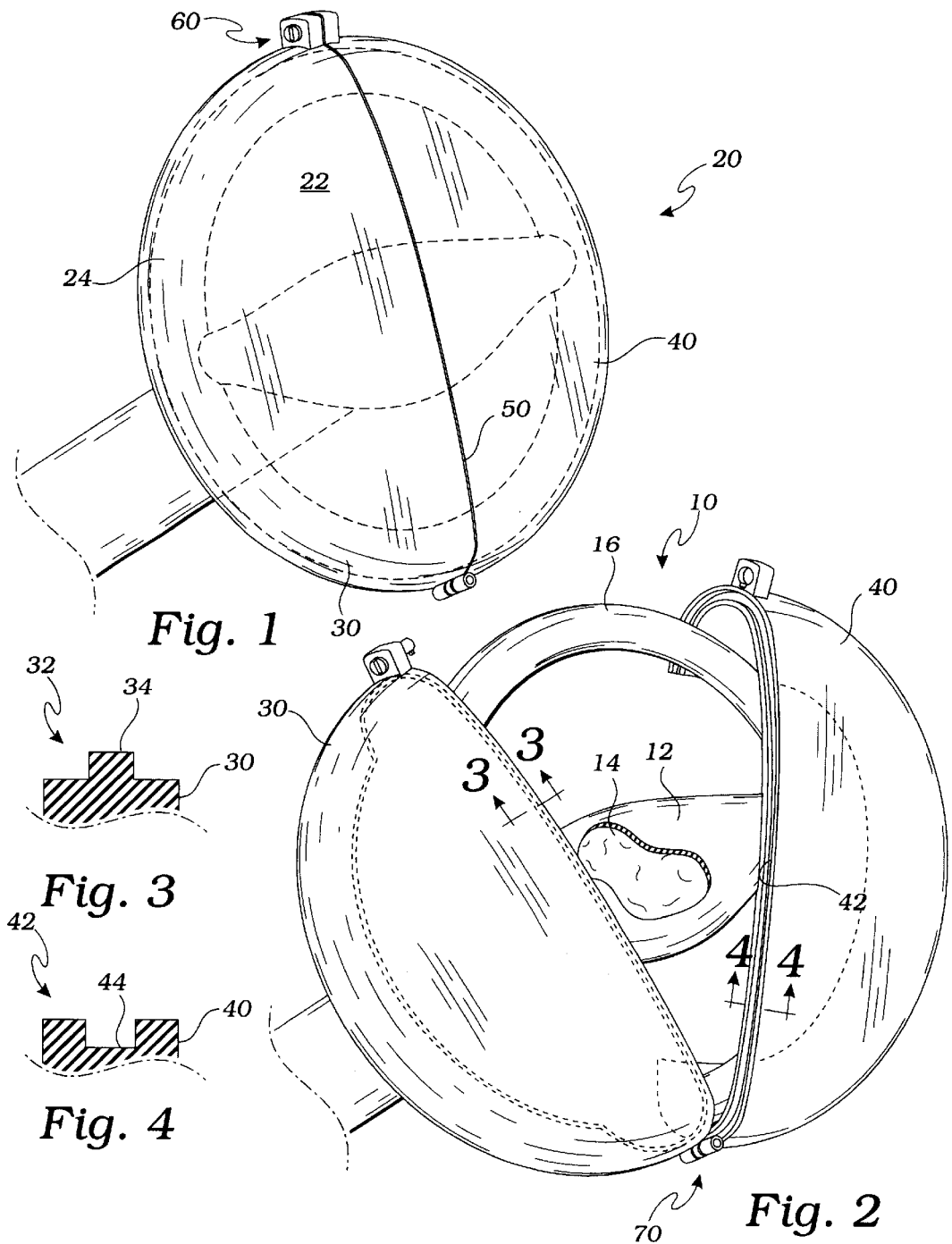

ANTI-THEFT DEVICE FOR PROTECTING AN AUTOMOBILE AND ITS AIRBAG

RELATED APPLICATIONS

This application claims priority and is entitled to the filing date of U.S. Provisional application Ser. No. 60/382,315 filed May 22, 2002, and entitled "Anti theft device that protects both, an automobile and its air bag." The contents of the aforementioned application are incorporated by reference herein.

INCORPORATION BY REFERENCE

Applicant(s) hereby incorporate herein by reference, any and all U.S. patents, U.S. patent applications, and other documents and printed matter cited or referred to in this application.

BACKGROUND OF THE INVENTION

1. Field of the Invention

This invention relates generally to antitheft devices for automobiles and more particularly to a steering wheel cover capable of securing a vehicle by preventing the steering wheel from being turned, and capable of preventing theft of the airbag located within the steering column.

2. Description of Related Art

The following art defines the present state of this field:

Curiale, U.S. Des. Pat. No. 380,135 describes a vehicle anti-theft steering wheel cover design.

Somerfield, U.S. Des. Pat. No. 385,175 describes a steering wheel immobilizer design.

McGuire, U.S. Des. Pat. No. 1,329,913 describes a steering wheel locking device comprising in combination; a solid disk, a second disk spaced therefrom, one-half of which is rigidly fixed about its circumferential edge to the first mentioned disk and the other half being hingedly attached to the fixed half, a circumferential flange carried by—the hinged, half which, when engaging the disk, will overlap the edge of same, and an extension of said flange adjacent the hinge, that will first engage the edge of the disk and act as a guide to the succeeding portion of the flange, substantially as described.

Gorman, U.S. Pat. No. 3,982,602 describes a housing for preventing access to the steering wheel of an automobile. The housing is contoured generally in the form of a truncated cone having a generally cylindrical collar disposed at the small end thereof. Extending across the large end of the truncated cone is a generally planar member. Disposed within a plane, which extends through the axis of the cone is a hinge for selectively opening the housing for access to the interior.

Dalton et al., U.S. Pat. No. 5,537,847 describes an anti-theft device for use in combination with the steering wheel of a motor vehicle comprising a cover member sized to completely cover the top of a motor vehicle steering wheel, said cover member further defining a slot therein said slot commencing at an edge of said cover. The device is further provided with a first hook member fixed to said cover member adjacent to the edge thereof said hook oriented and adapted to engage said wheel from the inside thereof; and an elongated member having a first outer end and a second inner end, said second end being adapted to be slidably engaged by said cover member slot. The elongated member further comprises a second hook member fixed to said elongated member at a point intermediate to said first and second end, said second hook member oriented and adapted to engage said wheel from the inside thereof. Finally, the device of the present invention is provided with locking means for locking the elongated member in a stationary position with respect to the cover member at any of a plurality of positions.

Taurog, U.S. Pat. No. 5,605,063 describes a steering wheel restraint for providing a vehicle theft deterrent having interfitting steel cover members adapted for placement over the steering wheel to disable the steering function. An externally mounted removable locking device is housed within a protector ring that is mounted to one of the cover members. A marginal flange of the cover members is coincidental to a peripheral rim of the steering wheel and provides a protective shield to prevent cutting of the rim. A rotation restrictor flap concealable behind the cover member is extendible for contact with an interior surface of the vehicle to thereby block rotation of the cover members. A stabilizer tab is concurrently projectible into the path of movement of a spoke of the wheel to prevent wheel rotation independently of the cover members. The components can be readily disassembled and the rotation restrictor flap and stabilizer tab can be displaced to a compact space-saving inactive position for storage.

Banez, U.S. Pat. No. 5,842,361 describes a motor vehicle security device for protecting against the cutting of an automobile steering wheel, which includes a protective member made of cut-resistant material covering the steering wheel rim and a connector for attaching the protective member to the steering wheel rim. The protective member radially and circumferentially overlies the steering wheel rim to preclude access to the rim and protect against cutting of the rim.

Townsend, U.S. Pat. No. 5,992,190 describes a device for inhibiting the rim of a vehicle steering wheel from movement thereby rendering the vehicle inoperable. The invention is comprised of first and second semicircular casings wherein each casing has an inwardly curving lip disposed around the circular portion of its periphery. Each casing is designed to fit over a portion of the vehicle steering wheel such that when so disposed, the first and second semicircular casings can be secured together to completely encase the rim of the vehicle steering wheel. When secured around the rim of the vehicle steering wheel in this manner, casings prevent any portion of the rim from being broken or cut. Additionally, a radial bar is attached to the outer surface of one of the casings wherein the bar extends beyond the periphery of the steering wheel to prevent substantial rotation of the steering wheel. The bar is also used to join the first and second casings. A locking mechanism is utilized to secure the first and second semicircular casing to one another to prevent removal of the invention from the vehicle steering wheel. In additional embodiments, hook members are located within the semi-circular casings. The hook members engage the rim of the steering wheel such that portions of the steering wheel are fully encapsulated about the steering wheel's "periphery". The hook structures retract before the device is removed from the steering wheel by the user.

Wu, U.S. Pat. No. 6,134,927 describes a covering lock for an automobile steering wheel including a cover and an anti-theft rod. The cover has a circumferential U-shaped hook to hook around the steering wheel of a car and the anti-theft rod able to be locked with the cover and extending rearward to prevent the steering wheel from rotated. Then the covering lock not only locks the steering wheel but also prevents a safety air bag fixed on the steering wheel from stolen.

Lenoci, EP 0989037 A1 describes a steering wheel cover comprising a number of slats or plates, each of which has the approximate shape of a sector of a circle, and all of which are linked to one another at a center so that they can rotate around said center, fan out from one another and close over one another. Each slat has a U-shaped cross section and a radius at least slightly larger than the radius of the steering wheel. The first and last slats are equipped with lock mechanisms to lock them together. When fitted over a steering wheel, opened and locked, the steering wheel cover prevents the steering wheel from being accessed or turned, and therefore is a deterrent to theft.

The prior art teaches vehicle security devices that cover the steering wheel of an automobile, steering wheel covering locks, specific locking systems for the former, wheel restraints, and designs for antitheft wheel covers, but does not teach a steering wheel covers with anti-jimmy feature and does not teach that a cover may be rigid and rotational on a steering wheel so that the cover will rotate rather then the cover and the steering wheel. The present invention fulfills these needs and provides further related advantages as described in the following summary.

SUMMARY OF THE INVENTION

The present invention teaches certain benefits in construction and use which give rise to the objectives described below.

The subject invention is an antitheft apparatus for protecting an automobile and its airbag and comprising in combination: a steering assembly for a vehicle and a theft-resistant cover preventing use of the steering assembly including deployment of an airbag. The steering assembly provides a centrally positioned hub portion enclosing the airbag, and a steering wheel. The cover provides a circular face portion covering the steering assembly and a circular peripheral flange portion extensive circumferentially from the face portion around the steering wheel portion. The cover is preferably split into two opposing cover halves along a central split line. At one end of the split line and integral with the cover halves is a means for locking the cover halves about the steering wheel portion. At the other end of the split line and integral with the cover halves, a hinging means enables the cover halves to pivot between a closed position engaging the locking means and an open position disengaging the locking means and thereby enabling engagement and disengagement of the cover with the steering wheel. Opposing abutting faces of the cover halves along the split line provide a recessive groove in one of the faces and a protruding tongue in the other of the faces. The tongue is engaged within the groove when the faces are abutting to thwart separation of the cover halves by jimmy action, that is, a jimmy, such as a crowbar, would not easily be able to force the two cover halves apart. This anti-jimmy feature is considered critical to the effectiveness of such steering wheel covers and enables the cover to be resistant to theft due to a tongue in groove engagement of the two halves. The cover fits loosely around the steering wheel so that the cover, but not the wheel can be turned when the cover is in place.

A primary objective of the present invention is to provide an apparatus and method of use of such apparatus that provides advantages not taught by the prior art.

Another objective is to provide such an invention capable of securing a vehicle against theft.

A further objective is to provide such an invention capable of securing an airbag of a vehicle against theft.

A still further objective is to provide such an invention capable of thwarting jimmy action.

A further objective is to provide such an invention cover enabled for rotating on a vehicle steering wheel so that the steering wheel cannot be turned without removing the cover.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings:

FIG. 1 is a perspective view of the preferred embodiment of the invention in a closed position on a steering wheel;

FIG. 2 is a further perspective view thereof in a partially open position;

FIG. 3 is a partial cross-section view taken along line 3—3 in FIG. 2; and

FIG. 4 is a partial cross-section view taken along line 4—4 in FIG. 2.

DETAILED DESCRIPTION OF THE INVENTION

The above described drawing figures illustrate the invention in at least one of its preferred embodiments, which is further defined in detail in the following description.

The present invention is an antitheft apparatus used with a vehicle steering assembly 10 such as is common on an automobile, truck, aircraft or boat. Such a steering assembly 10 uses a centrally positioned hub portion 12 enclosing a shock actuated airbag 14, and extending around the hub portion 12 is an integral steering wheel portion 16. The antitheft apparatus is a theft-resistant cover 20. The cover 20 provides a circular face portion 22 covering the steering assembly 10, and a circular peripheral flange portion 24 extensive circumferentially from the face portion 22 and therefrom, around the steering wheel portion 16 of the steering assembly 10. The cover 20 is preferably made of a strong material such as steel, or for weight savings, composite materials, as are very well known in the aircraft industry. The cover 20 is split into two opposing cover halves 30 and 40 (FIG. 2), and this split occurs along a central split line 50. At one end of the split line 50 and integral with the cover halves 30, 40 is a means for locking 60 the cover halves 30, 40 when the cover 20 is placed over the steering wheel portion 16, and at the other end of the split line 50, and integral with the cover halves 30, 40 is a means for hinging 70 functionally enabling the cover halves 30, 40, to pivotal thereabout between the closed position shown in FIG. 1 for engaging the locking means 60, and an open position shown in FIG. 2, disengaging the locking means 60 and thereby enabling engagement and disengagement of the cover 20 with the steering wheel portion 16 and thereby covering the entire steering assembly 10. Clearly, in such a position, the cover 20, when locked in place, is able to prevent theft of the airbag 14. However, the diameter of the flange portion 24 is greater than the diameter of the steering wheel portion 16 so as to provide a loose fit around the steering wheel portion 16 so that the entire cover 20 will rotate on the steering wheel portion 16 without the steering wheel portion 16 rotating as well. This prevents the turning of the steering wheel portion 16 while the cover 20 is locked in place and therefore prevents a thief from steering the vehicle so that he/she cannot drive the vehicle.

Dual abutting faces 32 and 42 (FIGS. 3 and 4) of the cover halves 30, 40 are extensive along the split line 50 and the flange portion 24, and these provide a means for interlocking the two cover halves 30, 40. Preferably, a recessive groove 44 in one of the faces 42 receives a protruding tongue 34 in the other of the faces 32, the tongue 34 engaged within the groove 44 when the faces 32, 42 are abutting. This condition is fulfilled when the cover 20 is in place on the steering wheel portion 16 and the locking means 60 is fastened. This interlocking face relationship is a key to the novelty of the present invention and provides user benefit. The circular peripheral flange portion 24, as clearly shown in FIG. 2, is extensive circumferentially from the face portion, and continuing around the steering wheel portion of the steering assembly, arcuately and angularly over approximately 180 degrees. The interlocking face relationship is continuous over this arcuate shape over the full 180 degrees. A thief who will want to steal a vehicle that has the present invention locked on the steering wheel assembly 10, will try to either cut the means for locking 60 or the means for hinging 70, or jimmy open the two cover halves 30, 40. All three of these avenues to removal of the cover 10 are protected. The locking means 60 and the hinging means 70 are integral extensions of the flange portion 24 so that a jimmy, such as a crowbar, cannot be used to lever either of these elements so as to break them off. Also, the interlocking nature of the abutting faces 32, 42 prevents the jimmy from being inserted between the cover halves 30, 40 along the split line 50 of the abutting faces 32, 42 so that they cannot be forced apart.

To remove the cover 20 from the steering wheel portion 16, preferably, a key is inserted into the locking means 60 to open it, the two cover halves 30, 40 then being pivoted about the hinging means 70, one to each side of the hinging means 70 until the flange portion 24 is able to be disengaged with the steering wheel portion 16, and then the cover 20 is lifted off the steering wheel portion 16. The cover 20 may be closed again and placed in an unused or unoccupied portion of the vehicle when it is not in use.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. An antitheft apparatus comprising in combination: a steering assembly for a vehicle, the steering assembly providing a centrally positioned hub portion enclosing a shock actuated airbag, and extending around the hub portion and integral therewith, a steering wheel portion; and a theft-resistant cover, the cover providing a circular face portion covering the steering assembly and a circular peripheral flange portion extensive circumferentially from the face portion and therefrom, around the steering wheel portion of the steering assembly arcuately and angularly over approximately 180 degrees; the cover split into two opposing cover halves along a central split line; at one end of the split line and integral with the cover halves, a means for locking the cover halves about the steering wheel portion; and at the other end of the split line and integral with the cover halves, a hinging means, the cover halves pivotal thereabout between a closed position engaging the locking means and an open position disengaging the locking means and thereby enabling engagement and disengagement of the cover with the steering wheel portion; the cover halves providing dual abutting and interlocking faces of the cover halves, extensive along the split line on the face portion and continuously around the flange portion; the diameter of the flange portion being greater than the diameter of the steering wheel portion enabling a loose fit around the steering wheel portion so that the cover will rotate on the steering wheel portion without the steering wheel portion rotating as well.

2. The apparatus of claim 1 wherein one of the interlocking faces provides a recessive groove and the other of the interlocking faces provides a protruding tongue, the tongue engagable with the groove when the faces are abutting with the cover locked in place around the steering assembly.

3. The apparatus of claim 1 wherein the locking means includes a lock formed integrally with the cover halves.

4. An antitheft apparatus comprising: a theft-resistant steering wheel cover, the cover providing a circular face portion for covering a steering wheel of a vehicle, and a circular peripheral flange portion extensive circumferentially from the face portion and curved therefrom for fitting around the steering wheel; the cover split into two opposing cover halves along a central split line; at one end of the split tine and integral with the cover halves, a means for locking the cover halves about the steering wheel; and at the other end of the split line and integral with the cover halves, a hinging means, the cover halves pivotal thereabout between a closed position engaging the locking means and an open position disengaging the locking means and thereby enabling engagement and disengagement of the cover with the steering wheel; dual abutting faces of the cover halves, extensive along the spilt line in the face portion and the flange portion, providing a recessive groove in one of the faces and a protruding tongue in the other of the faces, the tongue engaged within the groove with the faces abutting.

5. The apparatus of claim 4 wherein the locking means includes a lock formed integrally with the cover halves.

\* \* \* \* \*